United States Patent
Robertson

(10) Patent No.: US 8,735,333 B2
(45) Date of Patent: May 27, 2014

(54) PARTICLES

(75) Inventor: Ewen Robertson, Aberdeen (GB)

(73) Assignee: Ewen Robertson, Glasgow (GB)

( * ) Notice: Subject to any disclaimer, the term of this patent is extended or adjusted under 35 U.S.C. 154(b) by 865 days.

(21) Appl. No.: 12/085,530

(22) PCT Filed: Dec. 1, 2006

(86) PCT No.: PCT/GB2006/004498
§ 371 (c)(1),
(2), (4) Date: Jul. 14, 2008

(87) PCT Pub. No.: WO2007/063325
PCT Pub. Date: Jun. 7, 2007

(65) Prior Publication Data
US 2009/0143259 A1    Jun. 4, 2009

(30) Foreign Application Priority Data

Dec. 1, 2005 (GB) .................................. 0524520.4

(51) Int. Cl.
*C09K 8/80* (2006.01)

(52) U.S. Cl.
USPC .................... 507/261; 507/267; 166/305.1

(58) Field of Classification Search
USPC ................. 507/261, 267; 166/305.1
See application file for complete search history.

(56) References Cited

U.S. PATENT DOCUMENTS

| | | | | |
|---|---|---|---|---|
| 3,587,741 A | * | 6/1971 | Casey | 166/278 |
| 4,493,875 A | | 1/1985 | Beck | |
| 5,225,123 A | * | 7/1993 | Torobin | 264/43 |
| 5,893,416 A | * | 4/1999 | Read | 166/304 |
| 2003/0069143 A1 | * | 4/2003 | Collins | 507/200 |
| 2005/0028976 A1 | * | 2/2005 | Nguyen | 166/276 |
| 2005/0034861 A1 | | 2/2005 | Saini | |
| 2006/0124302 A1 | | 6/2006 | Gupta | |
| 2006/0169450 A1 | * | 8/2006 | Mang et al. | 166/278 |

FOREIGN PATENT DOCUMENTS

| | | |
|---|---|---|
| EP | 0 071 961 | 2/1983 |
| EP | 1 619 351 | 1/2006 |
| WO | WO 98/40606 | 9/1998 |
| WO | WO 99/36668 | 7/1999 |
| WO | WO 9936668 A1 * | 7/1999 |
| WO | WO 99/54592 | 10/1999 |

OTHER PUBLICATIONS

Hibbeler et al, SPE 81017, An integrated long-term solution for migratory fines damage, Apr. 2003.*
Michael Byrne et al., "Improved Selection Criteria for Sand Control—When are 'Fines' Fines?", pp. 1-14, SPE 128038 SPE International, Society Petroleum Engineers, Feb. 12, 2010.

* cited by examiner

*Primary Examiner* — Alicia Bland
(74) *Attorney, Agent, or Firm* — Drinker Biddle & Reath LLP

(57) ABSTRACT

Manufactures particles comprising a chemical treatment agent which are useful in wells are provided. The particles have the advantage of being able to chemically treat a well, e.g. to remove filter cake. Embodiments of the invention improve well production by providing sand control and/or increasing permeability of a gravel pack. Methods of using the particles and a gravel pack comprising the particles are also provided.

29 Claims, 2 Drawing Sheets

PARTICLES

FIELD OF THE INVENTION

This invention relates to a manufactured particles and method for it's use in wells, particularly but not exclusively for sand control and/or delivery of chemicals in hydrocarbon production wells.

BACKGROUND

Sand production from hydrocarbon producing wells is a common problem which can inhibit the flow of hydrocarbons and damage the well. To mitigate this problem, a sand screen may be deployed in the well which acts as a filter to resist ingress of particles above a certain diameter.

In order to protect the sand screen from hole collapse, in-situ geo-mechanical loads and stresses and in order to enhance its filtering function, it is known to add a "gravel pack" external to the screens to support the open hole formation rock structure in the well. A gravel pack is a plurality of gravel particles, which allow the flow of fluid therebetween but resist the flow of sand therebetween.

The delivery of chemical treatment agents is often done using coiled tubing injection strings. The chemicals delivered may be chosen for a number of different applications. One such application is to dissolve a filter cake which has been deposited during a drilling and completion process.

However a problem with such a delivery is that the chemicals will tend to act on the thinnest section of filter cake. Once this relatively thin section dissolves the treatment fluid(s) within the hole section will flow hydrostatically into the near well bore/reservoir and will not act on the remaining filter cake within the well.

In the presence of a gravel pack, application of chemicals using coil tubing strings to place the treatment in-situ to act on, for example, a filter cake, is particularly ineffective because it is often difficult for the chemicals to be directed at the filter cake due to much of the space being taken by the gravel pack. This is particularly so for the upper side of a horizontal well.

SUMMARY OF THE INVENTION

According to a first aspect of the invention, there is provided a manufactured particle for use in a well or reservoir, the manufactured particle having a curved outer surface, the particle comprising at least one chemical treatment agent.

The chemical treatment agent may suitably be an agent suitable to dissolve filter cake which has been deposited during a drilling and completion process. Typically acids are used to dissolve the filter cake, and accordingly suitable chemical treatment agents include acids. The chemical treatment agent may suitably comprise solid divalent acids such as short chain organic acids, for example, one or more of acetic acid, propionic acid, glutaric acid and maleic acid. Alternative or additional chemical treatment agents may comprise demulsifiers, relative permeability modifiers and/or scale inhibitors. It should, however, be noted that any chemical treatment agent useful within the context of a well bore may be used.

One advantage of the curved outer surface is the improved flow characteristics over the particles which can result in a higher rate of hydrocarbon production from the well. Another advantage of the curved surface is to provide a more efficient flowpath for the fluids in the well. This reduces the pressure drop associated with gravel packs. The pressure drop is preferably minimised. The manufactured particles may be at least partly spherical, oval, egg-shaped, or any other shape with a curved outer surface.

In certain embodiments, the manufactured particles with the curved outer surface are substantially spherical.

Manufactured particles in this context means man-made particles. The manufactured particles may, for example, be made from a plastics-based (i.e. polymeric) material or a glass material. Suitably the manufactured particles are very unreactive, and essentially inert, typically over the life cycle of the well. The type of material will obviously be chosen so that it is inert in the typical conditions expected within the well.

Alternatively the particles could be at least partially, preferably substantially, manufactured from a chemical treatment agent. Where the particle is manufactured from a chemical treatment agent, the treatment agent should generally be solid at the temperatures and other physical conditions expected to be encountered by the particle when it is being introduced into a wellbore. The chemical treatment agent may be combined with one or more binging agents, which may serve to add strength or chemical resistance to the particle though this is not essential in many instances. Specific chemical treatment agents which may be suitable for forming the particle include acids which are solid at the desired temperatures (e.g. over 50° C.). For example, solid divalent acids, e.g. malonic, glutaric or maleic acid or variants may be particularly suitable, depending on requirements in terms of melting point etc.

The chemical treatment agent may conveniently be released from the particle by introduction of an activation agent. In one embodiment the activating composition may be water which dissolves the chemical treatment agent, thus activating it; such a system is particularly suitable for water soluble acids.

In one embodiment of the present invention a chemical treatment agent is provided within a void in the particle, the void being in fluid communication with the environment outside the particle. This is particularly appropriate where the particle is not manufactured from a chemical treatment agent, though it is also perfectly possible when it is.

The void may suitably extend from one side of the particle to another and thus provide at least one flowpath in the particle. The particle may therefore comprise a flowpath leading from a first side of the particle to a second, typically generally opposite, side of the particle.

The particle may comprise a second flowpath extending therethrough from one side of the particle to another. The second flowpath may suitably be perpendicular to the first flowpath.

The particle may have a third or further flowpath extending therethrough from one side of the particle to another.

Where two or three flowpaths are provided, it is preferable that the flowpaths run approximately perpendicular to each other, though other angles may be suitable.

Where three flowpaths are provided, it is preferred that each flowpath is approximately perpendicular to the others, i.e. effectively forming X, Y and Z axes in 3-dimensions.

It should, however be understood that other angles, e.g. between 1 and 90 degrees, preferably between 45 and 90 degrees, between the flowpaths may be used. Furthermore, where more than three flowpaths are provided it will be understood that it is not possible to have all flowpaths perpendicular to the others. Though, the particle may of course comprise more than three flowpaths, preferred embodiments generally have one, two or three flowpaths.

Thus in particularly preferred embodiments, three flowpaths extend through the particle each perpendicular to the other two flowpaths; the three flowpaths could thus be represented by the X, Y and Z axis of Cartesian co-ordinates.

It may be preferred that the at least one flowpath is linear and extends from one side of the particle to the opposite side of the particle. It is generally preferred that the at least one flowpath is substantially straight, i.e. taking the shortest path from one point on the surface of the particle to another point on the surface of the particle, though it is envisaged that curvature or tortuosity of the flowpath may be present in some embodiments.

The at least one flowpath may or may not extend through the centre of the particle. Where more than one flowpath is provided, the flowpaths may intersect at some point along their length. Typically this will be at or near the middle of the particle, though it need not necessarily be so.

Where the particle is substantially spherical, the at least one flowpath may suitably extend across a diameter of the particle, i.e. taking the longest possible route through the particle. It should be understood that the term "diameter" need not have its strict geometric meaning, and could be used to apply to particles which are not particularly spherical. Where more than one flowpath is provided, it follows that the flowpaths may be provided on different diameters, which may conveniently be perpendicular to one another.

The cross section of the at least one flowpath may be essentially any shape, though for convenience it is generally spherical.

The minimum diameter of the at least one flowpath may be at least 0.1 mm, preferably at least 0.25 mm, more preferably at least 0.4 mm.

The minimum diameter of the at least one flowpath may be at most 15 mm, preferably at most 5 mm, more preferably at most 1 mm.

The minimum diameter of the at least one flowpath as a proportion of the diameter of the particle is preferably between 1:1.25 to 1:5.

The diameter of the at least one flowpath may be constant or it may vary across its length. In one embodiment the flowpath may have a given diameter at or near the surface of the particle and expand to provide a relatively large void within the particle.

It should therefore be understood that the void may, in one embodiment, take the form of an internal cavity linked to the outside via openings, thus defining a flowpath. In another embodiment the void may be provided by the empty space provided by at least one flowpath of essentially constant diameter (also referred to as a "port"). The configuration of the void will be largely dependant on the requirements of the particle and the technique of manufacture. Complex hollow forms of particle will typically require moulding, e.g. in two halves, which are then bonded together, whereas more simple forms may be formed in numerous other ways, e.g. extrusion or drop formation. Straight flowpaths of constant diameter can conveniently be formed by drilling or extrusion, but this may be difficult or impossible to achieve for more complex flowpaths.

It should be noted that the number of flowpaths can be altered to provided a desired level of porosity to the particle, and consequently to the gravel pack into which it may be incorporated. It is generally easier to provide a large number of flowpaths in a larger particle. In particularly small particles it may, in some circumstances, only be practicable to provide one flowpath.

In certain embodiments it may be desirable that where the flowpath meets the surface of the particle, the edge formed is at least partially smoothed to some extent. This may be achieved, for example, by rounding off (radiusing) or chamfering the edge. This has the advantage of maximising interaction of a chemical treatment agent within the particle with the outside environment. The smoothing may be achieved by providing a rounded edge which has a radius equivalent to from half to twice the flowpath. The smoothing may be provided as part of the moulding or extrusion process, or it could be provided later, e.g. by drilling a countersink etc.

The manufactured particles may be at least 0.25 mm in diameter. Typically they are preferably at least 1 mm, more preferably at least 2.5 mm. Thought where sand control is required, it will be understood that small particles, i.e. up to 2 mm, are preferred.

Though there is no real upper size limit to the particle size, aspects such as strength of the particle, ease of manufacture, ease of handling and the size of the typical wellbore mean that particles with an upper size limit of about 30 mm in diameter, more preferably around 20 mm are typical. Particles having a maximum diameter of 10 mm are generally preferred, more preferably 4 mm.

For applications of the manufactured particles which include sand control, smaller particles are preferably used compared to applications (such as chemical delivery) where no sand control is performed.

Typically particles having a diameter of 5 mm or less may be suitable for sand control. Particles with diameters larger than around 5 mm are not suitable for sand control, though they may perform some roll in sand management. Generally, for reliable sand control, it is important that the diameter of the particle is at most 2 mm, more preferably 1 mm, and this is a preferred embodiment of the present invention. The control of sand is extremely important in many well applications, and means for achieving control while maximising production from the well are highly desired. The smaller channels formed between the smaller particles aid the filtering function of the gravel pack; this is not required when the manufactured particles are not to aid sand control. Thus to provide a larger capacity, the manufactured particles for chemical delivery only are typically larger than those used for sand control.

Where the particle is to be used primarily for chemical delivery it may be preferred that the particle is essentially hollow, i.e. it has a large void within the particle. It may conveniently have a substantially constant wall thickness, the thickness of the wall generally being selected to provide sufficient mechanical strength to the particle whilst maximising internal volume. The wall thickness of a hollow particle may suitably be from about 0.5 mm to 2 mm. It is often useful to consider wall thickness as a ratio to particle diameter; preferred ratios of wall thickness:particle diameter are from 1:5 to 1:30, though it will be understood that other ratios may be suitable depending on the desired characteristics of the particle. A hollow sphere is a particularly suitable shape for hollow particle applications as it maximises volume and strength of the particle for a given mass of particle. Where the particles are essentially hollow, there remains a requirement for the internal volume to be in communication with the environment outside the particle, so that the chemical additive can escape the particle. This is typically achieved via one or more openings provided in the wall of the particle. Typically such a hollow particle comprises at least two openings, which conveniently provides a flowpath through the particle. It may be preferable to provide more than 2 openings, e.g. 4 or 6 openings providing 2 or 3 linear flowpaths respectively. The flowpaths may conveniently be provided perpendicular to each other. Of course, it should be noted that the number of openings may be varied according to the desired porosity or release properties of the particle; more openings resulting in increased porosity and increased release rate.

Typically there is less scope in a small particle for providing a hollow particle and thus maximising internal volume, though it may still be achieved.

The manufactured particles used for sand control may be at least 0.25 mm in diameter, preferably at least 0.5 mm.

Preferably the manufactured particles used for sand control are no more than 5 mm in diameter, preferably smaller than 4 mm in diameter, especially less than 2 mm in diameter.

The typically larger manufactured particles which are not for sand control may be above about 5 mm. Though there is no real upper size limit to the particle size, aspects such as strength of the particle, ease of manufacture, ease of handling and the size of the typical wellbore mean that particles with an upper size limit of about 30 mm in diameter, more preferably around 20 mm are preferred.

The manufactured particles may be manufactured using a continuous feed extrusion process. A convenient aspect of this process is that one or more flowpaths can be introduced very simply to the particles as part of the extension process, particularly flowpath(s) which are all orientated in the direction of extrusion. Additional flowpaths can be introduced by a number of processes which are well known in the art. This may be combined with the extrusion process, e.g. using a retractable pin arrangement to form flowpath(s) in the newly extruded particle.

The particles may also be made using a machined template within which the required particle dimensions and shapes can be achieved.

Another technique, which may be particularly suitable for producing more complex particle, is moulding. Where moulding is used, the flowpaths can conveniently be introduced using retractable pin cores to define the openings.

The manufactured particles are typically made from a material capable of having holes drilled or otherwise provided or formed therein. Such holes may be formed by any conventional technique. In some embodiments they may be drilled or formed following production of the particles. In other embodiments, as mentioned above, they may be formed integrally as part of the manufacturing process of the particles. Where one port is required this may be conveniently provided as part of an extrusion process.

Preferably the density (specific gravity) of the manufactured particle is 0.5 SG-4.5 SG, preferably 2.0 to 2.5 SG.

Preferably the manufactured particle is negatively buoyant. Buoyancy refers to buoyancy in either the medium in which the particles are expected to be contained in use within the well, or with respect to a fluid which is used during the process by which particles are introduced into the well, i.e. the carrier fluid. Buoyancy with respect to the carrier fluid is of particular importance as this determines, to some extent, the ability of the particles to pack the wellbore. Where the particles are to be provided in a mixture with other material (e.g. gravel), it may be desirable to match the buoyancy of the particles and the other material, to prevent stratification or other separation of the mixture.

The particles may be at least partially coated with a coating material. The coating material may be provided to protect the particle or to provide additional functionality. The coating material may suitably be a bonding material which allows the particles to be bound together. Suitable bonding materials are well known in the art. Typically the bonding material is inactive until the particles are located in position, as it would be difficult or impossible to pump or process bonded particles. The bonding agent may be activated in number of ways, e.g. time delayed curing, chemical activation, pressure activation or heat activation. Suitable bonding materials are known in the art, and typically include resins. For example an epoxy resin may be suitable.

According to a second aspect of the present invention, there is provided a gravel pack, the gravel pack comprising a plurality of manufactured particles, the manufactured particles having a curved outer surface and comprising a chemical treatment agent.

The gravel pack may be for sand control and/or may be to support the open hole formation rock structure.

Preferably the contact area between a target for the chemical treatment agent, such as filter cake, and the chemicals is maximised, preferably by placing the manufactured particles and hence the chemical additives in direct contact with the filter cake over the entire length of the open hole section.

Particles carrying several different chemical additives and/or of difficult sizes may be used in the gravel pack. Such particles may provide different functions.

The gravel pack may also comprise a plurality of non-manufactured particles. Preferably at least 1% of the particles in the gravel pack comprise manufactured particles as described herein, preferably at least 20%, more preferably at least 50%, especially at least 75% of the particles in the gravel pack comprise manufactured particles as described herein.

The manufactured particles of the second aspect of the invention may have any feature or features (including optional features) of the manufactured particles of the first aspect of the invention.

According to a third aspect of the present invention, there is provided a method of treatment of a well or reservoir, the method comprising:

providing a plurality of particles, at least a portion of the particles being manufactured particles having a curved outer surface and comprising a chemical treatment agent; and adding the particles into the well or reservoir in order to allow the chemical treatment agent to treat the well or reservoir.

Typically the method according to the third aspect of the invention uses manufactured particles in accordance with the first or second aspect of the invention.

In one embodiment the method may comprise adding a chemical treatment agent to a void in at least some of the manufactured particles.

Typically the manufactured particles may either be used in a gravel pack of a well or to deliver chemicals to a well/reservoir, or for both applications, i.e. for use in a gravel pack and to deliver chemicals to a well/reservoir.

References herein to the well are typically references to a wellbore.

References herein to reservoir are typically to the near wellbore reservoir.

The method may suitably involve adding the particles to the well or reservoir in association with an inhibition agent which inhibits activation of the chemical treatment agent. The inhibition agent may suitably comprise a non-aqueous fluid where the chemical agent needs water to become active, e.g. an acid. Other inhibition agents may be appropriate for other chemical treatment agents and would be apparent to the person skilled in the art. Preferably the inhibition agent is a carrier fluid which is used when pumping the particles into the well or reservoir, e.g. as a slurry.

The method may further comprise adding an activation agent to the well or reservoir. This may suitably be water. Again, other activation agents would be suitable for other chemical treatment agents.

According to a fourth aspect of the present invention, there is provided a method of providing a gravel pack in a well or reservoir, the method comprising:

providing a plurality of particles, at least a portion of the particles being manufactured particles having a curved outer surface and comprising a chemical treatment agent;

disposing the particles into the well or reservoir to provide a gravel pack suitable to resist production of sand from the well.

Typically the method according to the fourth aspect of the invention uses manufactured particles in accordance with the first aspect of the invention.

In certain embodiments, the method according to the fourth aspect of the present invention may also use any feature or features including optional features of the method according to the third aspect of the invention.

The manufactured particles may be pumped down to the well as a slurry, and the liquid within the slurry allowed to dissipate into the near wellbore. The carrier liquid used in the slurry may suitably comprise an inhibition agent. For example the inhibition agent may be an oil where the chemical treatment agent is an acid. Water may then be introduced into the well which will dissolve, and thus activate, the acid. Suitably the carrier fluid is comprised substantially entirely on inhibition agent.

The gravel pack may also comprise a plurality of non-manufactured particles. Preferably at least 1% of the particles in the gravel pack comprise manufactured particles as described herein, preferably at least 20%, more preferably at least 50%, especially at least 75% of the particles in the gravel pack comprise manufactured particles as described herein.

Any feature of any aspect of any invention or embodiment described herein may be combined with any feature of any aspect of any other invention or embodiment described herein *mutatis mutandis*.

BRIEF DESCRIPTION OF THE DRAWINGS

Embodiments of the present invention will now be described, by way of example only, with reference to the accompany drawings in which.

DETAILED DESCRIPTION OF THE INVENTION

Figure 1:
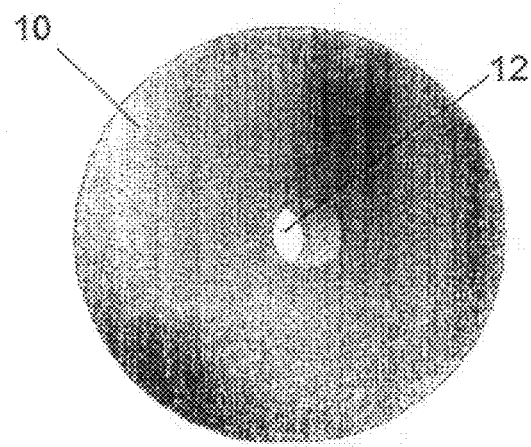
FIG. 1 is a perspective view of a first embodiment of a particle in accordance with the present invention.

A gravel pack (not shown) for use in a well comprises a plurality of particles, such as the manufactured particle 10 shown in FIG. 1.

The particle 10 is spherical and as such the flow of hydrocarbons through the gravel pack comprising a plurality of such particles is faster compared to the conventional use of gravel which has an irregular outer face rather than a curved outer face. Moreover the pressure drop which occurs when hydrocarbons flow through a gravel pack has been found to be less for gravel packs including the particle 10 compared to the irregular shaped gravel which is traditionally used.

A port 12 is shown which is provided through the centre of the particle 10. The port provides a flowpath through the particle. Hydrocarbons may flow through the port 12, thereby further increasing the overall flow rate of the hydrocarbons through the gravel pack comprising such particles.

The packed ported particles reduce the number of dead ends within the gravel pack, thus increasing the overall flow rate efficiency of the pack by 10% or more over a standard gravel pack.

Chemical treatment agents such as acids or alkalis, polymer compounds, liquid ceramics, brines or others may be added to the port 12. This provides a method for chemicals to access much of or even the entire near wellbore area. The chemicals may coat or otherwise treat the wellbore or near wellbore area. For example, the chemicals may be provided in order to break down a filter cake (for example, calcium hydrogen carbonate, calcium carbonate) or for other uses such as to act as a relative permeability modifier to reduce the production of water. Other suitable chemical agents are well known in the art.

To provide a manufactured particle 10 comprising a chemical treatment agent has benefits over conventional techniques for the removing of a filter cake from a wellbore wall because it can treat a much larger area of the filter cake.

In conventional techniques the addition of a chemical treatment agent to a well results in breakdown of a section of the filter cake usually the thinnest section. Once this initial section of the filter cake has been broken down, the chemical treatment agent tends to flow through the hole and dissipate. Thus further application of chemical treatment does not result in continued breakdown of the filter cake, and production is not further improved.

Treatment using particles comprising a chemical treatment agent has the advantage that the agent is localised at the area requiring treatment and is not free to flow away so readily. As a result, greater breakdown of the filter cake is possible.

The chemical treatment agents may comprise frozen monovalent acids for example acetic, propionic, butyric or pentanoic acid or variants depending on required properties in terms of melting point, solubility and acid strength. Acetic acid, for example, is soluble in water ($K_a=1.8\times10^{-5}$) with a melting point 17° C.

$$CaHCO_3(s)+2CH_3CO_2H(l)\rightarrow Ca(CH_3CO_2)_2(aq)+CO_2(g)+H_2O(aq)$$

However, the temperature in some drilling apertures (approx +80° C.) makes frozen acids difficult to handle unless pressurised and released on target site or kept within a membrane that is punctured at the target site or dissolve/decompose at the target site.

An alternative embodiment comprises solid divalent acids i.e. malonic, glutaric or maleic acid or variants depending on requirements in terms of melting point, solubility and acid strength, for example glutaric acid—melting point 98° C., solubility 64 g/100 g water at 20° C., $K_a=4.5$ and $0.4\times10^{-5}$; maleic acid—melting point 130° C., solubility 79 g/100 g water at 20° C., $K_a=1000$ and $0.06\times10^{-5}$.

Melting points are above that encountered of most drilling shafts. Reaction similar to that above for acetic acid but 1 mole of acid per 1 mole calcium hydrogen carbonate required.

However, the rate at which inorganic deposits found in drilling apertures are solubilised by acids in the presence of brine can be tested experimentally depending on the specific conditions for each application. Various engineering solutions may be used for on site delivery mechanisms and to ensure minimal dissolution of the chemical prior to location at site. For example chemicals may be sealed within the port by a membrane which dissolves or otherwise breaks down on contact with the near wellbore or any other area where the treatment is targeted. Alternatively, the chemicals may be coated or include retardants in order to delay their release.

The chemicals may be controlled released chemicals (fluids/solids), which once in place deliver the chemicals into solution vigorously.

Figure 2:
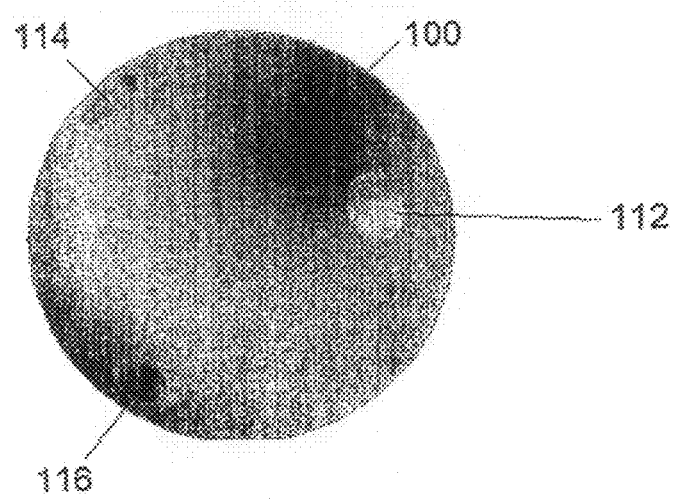
FIG. 2 is a perspective view of a second embodiment of a particle in accordance with the present invention.

A second embodiment of a particle 100 is shown in FIG. 2. The particle in FIG. 2 is the same as the particle in FIG. 1 except that it includes further ports 114, 116 which are at right angles to a first port 112.

The flow rate through a gravel pack comprising particles such as particle 100 is even higher than that of the first embodiment of the invention.

Figure 3:
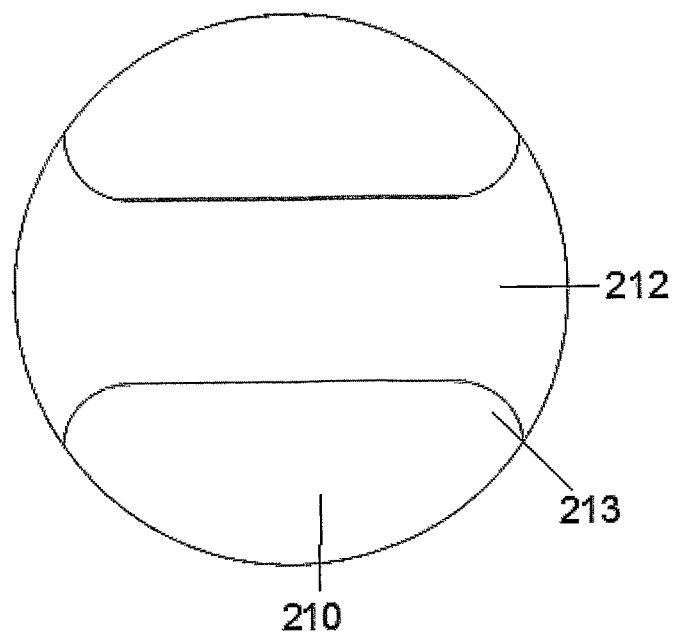
FIG. 3 is a cross section view of a third embodiment of a particle according to the present invention.

A third embodiment of a particle 210 is shown in FIG. 3. The particle is similar to that of FIG. 1, but it has a radiused edge 213 where the port 212 meets the surface outer surface of the particle 210.

Figure 4:
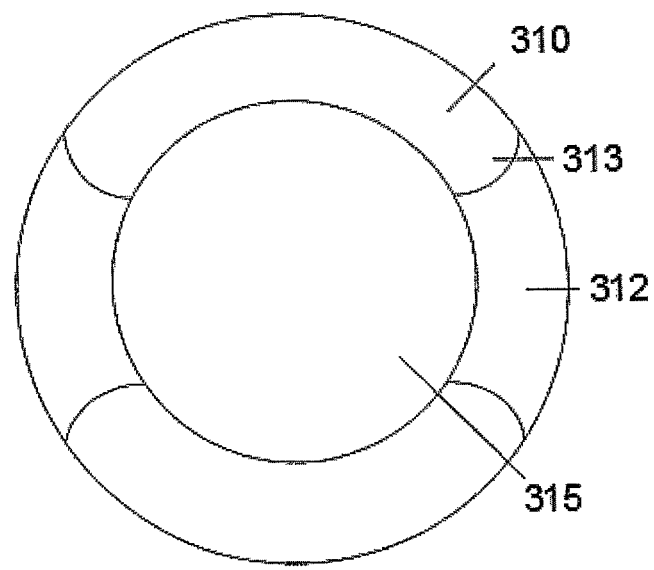
FIG. 4 is a cross section view of a fourth embodiment of a particle according to the present invention.

A fourth embodiment of a particle 310 is shown in FIG. 4. The particle 310 comprises an hollow centre 315, or void, which is linked to the outside via two openings 312 to provide a flowpath through the particle. The hollow centre is suitable for accommodating a relatively large amount of chemical treatment agent (not shown) relative to the volume of the particle 310. The particle 310 has a radiused edge 313 where the openings 312 meet the outer surface of the particle.

Thus, increased production from a well requiring sand protection, such as a gravel pack can be achieved using embodiments of the present invention. In an alternative embodiment, the particle may have two ports in it, corresponding to X and Y axis of Cartesian co-ordinates, or as a further alternative more than three ports.

Alternative shapes may be used for the particles, such as a ring-shape, or doughnut-shape; but the particle is generally shaped to generate an optimum flowpath through and around it while minimising the pressure drop across it. Its interaction with other neighbouring particles in-situ to generate an optimum flow pattern through the gravel pack as a whole is also important.

In these embodiments, the spherical particles 10, 100, 200, 300 are 3.0 mm (nominal) diameter, with 0.5 mm diameter ports in both cases. The port diameter was chosen to represent the limiting diameter for the ingress of sand through the holes, and is the same as the gap between spheres.

Smaller manufactured particles in accordance with the present invention preferably deliver chemical treatments, perform sand control and improve inflow/outflow performance. The primary application of the smaller particles is for a well design that requires gravel packing for sand control.

Larger manufactured particles in accordance with the present invention deliver chemical treatments and appear hydro-dynamically invisible in-situ (i.e. do not detrimentally impact inflow/outflow performance). The primary application of the larger manufactured particle is for a well design that does not require gravel packing for sand control, but would benefit from improvements to outflow/inflow performance.

The particles 10, 100, 200 may be made by Continuous Extrusion Manufacturing. In this process, the spherical shape of the particle is achieved from a continuously rotating mould which shapes the particle and breaks it off from the continuous feed. A dimensionally controlled port (not shown) allows for the extrusion of material to deliver the required diameter to port ratios. Two additional through ports (y-axis & z-axis) can be added to the product during this phase relative to the main extrusion axis (x-axis). An x-axis extrusion rod can be used deliver any required chemical(s) into the ported space at the end of the continuous feed. Such extrusion based techniques are particularly suited to plastics-based and glass materials.

Alternatively the particles may be made from injection moulding using a template. In this alternative process, a machined template allows for a plastics based compound to be injected into the mould forming the particles. The particle is then allowed to cure and become solid. The particles are broken out and process is repeated.

Where the particle is to be formed from a chemical treatment agent, e.g. a solid acid, this may be achieved by converting the chemical treatment agent to a liquid state and then introducing it into a mould, e.g. by injection or pouring. Once in the mould the liquid is allowed to convert back to a solid form; this may be conducted under pressure which can result in improved properties of the particle are in some instances. Typically conversion to a liquid state is achieved by heating the chemical treatment agent above its melting point. In some instances it may be, desirable to combine the chemical treatment agent with a bonding agent to improve mechanical properties, though often this will not be required. It should be noted that other techniques for forming particle from such chemicals are known, for example in the field of pharmaceutical processing, and such techniques could be used as appropriate.

Experiments

Experiments were performed which detailed modelling flow through packed gravel using Finite Element (FE) simulation of the Navier-Stokes equations. A number of simulations of flow through packed spheres were determined and the results compared to theoretical solutions.

Theory

Flow in oil-well packing is well described at the macro-scale by D'Arcy's law in isotropic media:

$$u_d = -\frac{\kappa}{\eta}(\nabla p + \rho g \nabla z) \quad (1)$$

where $u_d$ is the Darcy, or specific, discharge per unit area (ms$^{-1}$), $\kappa$ is the saturated permeability (m$^2$), $\eta$ is the dynamic viscosity (kgm$^{-1}$s$^{-1}$), p is the fluid pressure (kgm–2), g is the gravitational acceleration and z is the vertical co-ordinate. Here, the gravitational acceleration may be ignored.

A number of equations and relations for the saturated permeability have been proposed. The Carman-Kozensky relationship (which can be found in Carman, PZ, 1956, Flow Of Gases Through Porous Media, Butterworths, London) is widely-used for granular media.

$$\kappa = \frac{D^2}{180}\frac{\phi^3}{(1-\phi)^2} \quad (2)$$

where D is the grain diameter (m) and $\phi$; is the porosity. It is applicable to arbitrarily shaped particles of varying diameter, in which case the diameter, D, is the surface average grain diameter. Here, D is simply the grain diameter for the manufactured particles 10, 100, 200, 300. The range of validity of the Carman-Kozensky relationship is believed to be 0.1<Re<75. (See, Pan C, Hiplert M, Miller C T, 2001, Pore-Scale Modelling Of Saturated Permeabilities In Random Sphere Packings, Physical Review E, 64.)

The porosity, ø, is the percentage of 'space' between the gravel and may be found by taking the ratio of the density of the bulk material to the density of the particulate material:

$$\phi = 1 - \frac{\rho_B}{\rho_P} \quad (3)$$

For regularly-packed, mono-sized spheres, the porosity may be calculated from the volume ratio. For cubic packing:

$$\phi_{sc} = 1 - \frac{V_s}{V_c} = 1 - \frac{\frac{\pi}{6}d^3}{d^3} = 0.476 \quad (4)$$

For close tetrahedral packing:

$$\phi_{st} = 1 - \frac{V_s}{V_t} = 1 - \frac{\frac{4}{12}\frac{\pi}{6}d^3}{\frac{\sqrt{2}}{12}d^3} = 1 - \frac{\pi}{3\sqrt{2}} = 0.260 \quad (5)$$

For irregularly-packed spheres, the porosity will generally lie between these two values. For irregularly-shaped particles (such as gravel) the porosity will tend to be higher. For particles with a distribution of sizes, the porosity will tend to be lower as the smaller particles occupy the spaces in the lattice formed by the larger particles.

Experimental

The modelling package used here is produced by Fluent of Sheffield Business Park, Sheffield, UK, and comprises a pre-processor (GAMBIT) and an integrated solver and post-processor (Fluent).

This pre-processor incorporates its own solid modeller, and can import solid models in a variety of other standard forms. The main function of the pre-processor is to provide a mesh of the fluid volume for exporting to Fluent. Fluent solves the Navier-Stokes (N-S) equations (the basic equations of fluid motion) on the mesh imported from GAMBIT.

Modelling Results and Comparison with Theory

For the close-packed sphere case considered, the porosity is ø–0.260, giving a value of $\kappa=1.605*10^{-9}$. The dynamic viscosity of $\eta=1.003*10^{-3}$ kg/m-s and the pressure gradient is $p_z=408$ Pa/m (4 Pa over 4 rows with a spacing of 2.45 mm per row). This gives a theoretical specific discharge of $u_d=0.65$ mms$^{-1}$, in very close agreement with the numerical results.

Thus it was found that realistic modelling of flow through a bed of packed spheres can be performed. The numerical simulation of flow involving gravel-packing of the order of –50-100 spheres was feasible and represented a suitable method for the study of more complex shapes.

Modified Gravel Results

The model tested the first embodiment 10 having the port 12 therethrough, and the second embodiment, with the three ports 112, 114, 116 through the spherical particles.

The spheres were then rotated randomly in increments of 30° on two axes. Thus some of the spheres might have a core in line with the flow, and some perpendicular, with many in-between.

Simulations were carried out to compare the performance of manufactured spherical particles without ports and those embodiments 10, 100 shown here with ports; all at a pressure of 4 Pa. The holes allow the carriage of further fluid and, depending on their orientation, may assist the flow, or have little or no effect on the flow. Moving from a single hole to a triple-axis set of holes increases the connectivity between the spaces and results in increased flow rate.

Unmodified spherical particles (within the scope of the present invention) yielded an average velocity of $0.73*10^{-3}$ ms$^{-1}$; the first embodiment had an average velocity of 0.77 ms$^{-1}$; and the second 3-axis embodiment yielded an average velocity of $0.82*10^{-3}$ ms$^{-1}$. These can no longer be compared to the standard theories. Although 'porosity' (equation 5, but with 'holes') may be calculated as 0.26, 0.29, and 0.35 respectively, the Carmen-Kozensky relationship (equation 2) strictly only applies to spherical particles and a direct comparison is not reasonable.

Thus increasing the porosity of the gravel increases the flow rate demonstrating that the method is sensitive enough to be used to demonstrate the likely advantages of future 'gravel' modifications.

The second embodiment 100 achieved more than 10% increase in flow rate.

Embodiments of the invention can have a plurality of particles with their flowpaths complementing neighbouring flowpaths such that they "link" together radially and along hole to increase flow efficiency, compared to standard gravels.

One benefit of including chemicals within the particles is the increased ability to mechanically deliver stimulation treatment(s) over the full length of the wellbore and an increased (or perhaps even unique) ability to mechanically deliver stimulation treatment(s) and the like to the high side of the wellbore.

Moreover it is possible for certain embodiments of the present invention to have the gravel pack slurry flowed over greater distances than standard gravel into a wellbore while using the same conventional placement equipment since the flow characteristic of the particles is better than that of conventional sand. Moreover the preferred neutral buoyancy of the particles also assists flow.

Improvements and modifications may be made without departing from the scope of the invention.

The invention claimed is:

1. A manufactured particle for use in a method of treatment of a well or reservoir for increasing inflow performance by removing or reducing filter cake deposited in a wellbore to increase hydrocarbon flow, the manufactured particle having a curved outer surface, and a void within the particle wherein the void extends from one side of the particle to another, providing first, second and third flowpaths through the particle, the first, second and third flowpaths extending through the center of the particle, wherein at least one of the first, second and third flow paths has a given diameter at or near the surface of the particle and expands to provide the void, the void being in fluid communication with the environment outside the particle, the particle comprising at least one chemical treatment agent provided in the void in the particle wherein the at least one chemical treatment agent comprises a solid divalent acid for breaking down the filter cake deposited within the wellbore, and wherein the first, second and third flowpaths are straight linear and run approximately perpendicular to each other, wherein the particle is essentially hollow to maximize internal volume and accommodate a large amount of chemical treatment agent relative to the volume of the particle and has a substantially constant wall thickness.

2. The particle of claim 1 wherein the chemical treatment agent comprises a short chain organic acids.

3. The particle of claim 1 wherein the chemical treatment agent comprises one or more of glutaric acid and maleic acid.

4. The particle of claim 1 wherein the chemical treatment agent comprises a demulsifier, relative permeability modifier or scale inhibitor.

5. The particle of claim 1 wherein the curved outer surface is spherical.

6. The particle of claim 1 which is manufactured substantially entirely from a plastics-based material or a glass material.

7. The particle of claim 1 wherein the particle is substantially spherical and the first, second and third flowpaths extend across a diameter of the particle.

8. The particle of claim 7 wherein the ratio of the minimum diameter of at least one of the first, second and third flowpath entrances to the diameter of the particle is from about 1:1.25 to about 1.5.

9. The particle of claim 1 wherein the particle has a specific gravity of from about 0.5 SG to about 4.5 SG.

10. The particle of claim 1 wherein the particle is at least partially coated with a coating material.

11. The particle of claim 10 wherein the coating material is a binding material.

12. A gravel pack for use in a well or reservoir comprising a plurality of manufactured particles, the manufactured particles having a curved outer surface and a void within the particle, the void extending from one side of the particle to another, providing first, second and third flowpaths through the particle, the first, second and third flowpaths extending through the center of the particle, wherein at least one of the first, second and third flow paths has a given diameter at or near the surface of the particle and expands to provide the void, the void being in fluid communication with the environment outside the particle, the particle comprising at least one chemical treatment agent provided in the void of the particle, wherein the at least one chemical treatment agent comprises a solid divalent acid for breaking down the filter cake deposited within the wellbore, and wherein the first, second and third flowpaths are straight linear and run approximately perpendicular to each other, wherein the particle is essentially hollow to maximize internal volume and accommodate a large amount of chemical treatment agent relative to the volume of the particle and has a substantially constant wall thickness.

13. A gravel pack according to claim 12 wherein the particles are placed in direct contact with the filter cake over the entire length of the open hole section.

14. A gravel pack according to claim 12 comprising particles carrying several different chemical additives.

15. A gravel pack according to claim 12 wherein at least 1% of the gravel pack comprises the manufactured particles.

16. A gravel pack according to claim 12 wherein at least 20% of the gravel pack comprises the manufactured particles.

17. A method of treatment of a well or reservoir, the method comprising:
providing a plurality of particles according to claim 1; and
adding the particles into the well or reservoir in order to allow the chemical treatment agent to treat the well or reservoir and/or to provide a gravel pack suitable to resist production of sand from the well.

18. The method of claim 17 wherein the particles are pumped down to the well as a slurry, and a carrier liquid within the slurry is allowed to dissipate into the near wellbore.

19. The method of claim 17 comprising adding the particles to the well or reservoir in association with an inhibition agent which inhibits activation of the chemical treatment agent.

20. The method of claim 19 wherein the inhibition agent makes up substantially all of the carrier fluid.

21. The method of claim 19 wherein the inhibition agent comprises a non-aqueous fluid.

22. The method of claim 17 comprising adding an activation agent to the well or reservoir.

23. The method of claim 22 wherein the activation agent is water.

24. The particle of claim 1 wherein the chemical treatment agent comprises one or more of acetic acid, propionic acid, glutaric acid and maleic acid.

25. A manufactured particle for use in a method of treatment of a well or reservoir for increasing inflow performance by removing or reducing filter cake deposited in a well bore to increase hydrocarbon flow as claimed in claim 1 wherein the particle, when in place, is adapted to deliver the chemical treatment agent into the solution vigorously.

26. A manufactured particle for use in a method of treatment of a well or reservoir for increasing in flow performance by removing or reducing filter cake deposited in a well bore to increase hydrocarbon flow, as claimed in claim 1, wherein the wall thickness of the hollow particle is from about 0.5 mm to 2 mm.

27. A manufactured particle for use in a method of treatment of a well or reservoir for increasing in flow performance by removing or reducing filter cake deposited in a well bore to increase hydrocarbon flow, as claimed in claim 1, wherein the ratios of the wall thickness; particle diameter are from 1:5 to 1:30.

28. A manufactured particle for use in a method of treatment of a well or reservoir for increasing in flow performance by removing or reducing filter cake deposited in a well bore to increase hydrocarbon flow, as claimed in claim 1, wherein the particle diameter is above 0.25 mm in diameter and has an upper size limit of about 30 mm in diameter.

29. A manufactured particle for use in a method of treatment of a well or reservoir for increasing in flow performance by removing or reducing filter cake deposited in a well bore to increase hydrocarbon flow, as claimed in claim 1, wherein the particle diameter is above 1 mm in diameter and has an upper size limit of about 10 mm in diameter.

* * * * *